Aug. 29, 1950     W. A. MAJOR     2,520,555
STORING AND FEEDING STRUCTURE FOR STOCK
Filed April 17, 1947     2 Sheets-Sheet 1

Inventor
William A. Major
By *Clarence A. O'Brien and Harvey B. Jacobson*
Attorneys Aug. 29, 1950  W. A. MAJOR  2,520,555
STORING AND FEEDING STRUCTURE FOR STOCK
Filed April 17, 1947  2 Sheets-Sheet 2
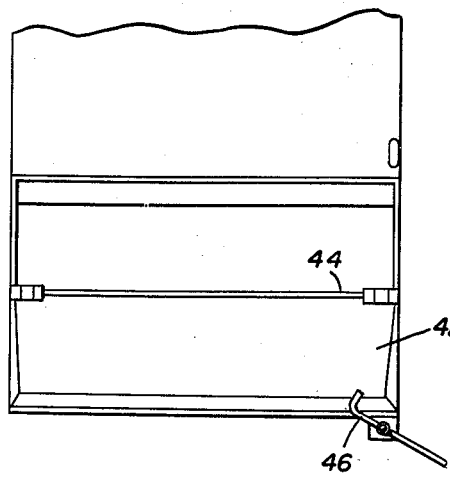
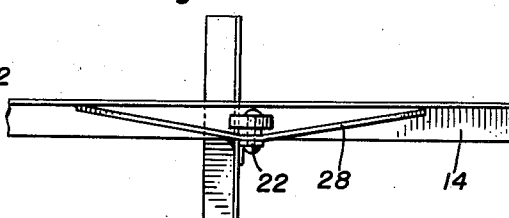
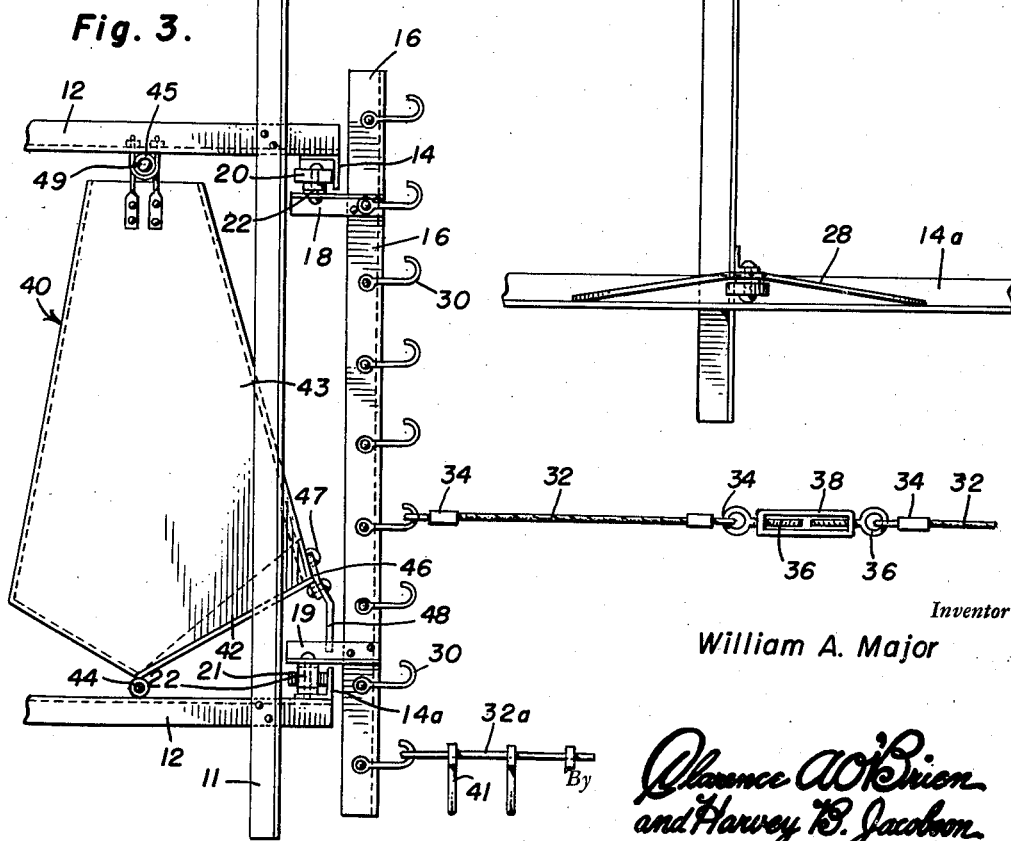
Inventor
William A. Major Patented Aug. 29, 1950

2,520,555

UNITED STATES PATENT OFFICE 2,520,555

STORING AND FEEDING STRUCTURE FOR STOCK

William A. Major, Peoria, Ill.

Application April 17, 1947, Serial No. 742,045

5 Claims. (Cl. 119—51)

This invention relates to stock feeding appliances and it has for its main object to provide a structure for storing and for dependably feeding stock or other animals during relatively long periods.

It will be readily understood that during those periods during which stock or other animals do not find their food by grazing on the land, constant attention is necessary to keep the stock properly fed. Neither automatic feeders nor mere storage of a sufficient quantity of hay or of a similar fodder permits to leave the stock without attendance as all these methods may lead to a tremendous waste of food material and are not sufficiently dependable to exclude great losses due to lack of fodder or inaccessibility of stored food. These methods moreover do not permit the use of different foodstuffs, such for instance as hay and grain.

It is therefore a primary object of the present invention to provide a structure which permits the storing of large quantities of fodder and the automatic feeding from the stored supply, giving permanent but strictly limited access to the stored fodder supply.

It is a further primary object of the present invention to provide a structure in which the access of the stock to the stored fodder supplies is limited by the consumption, thus preventing the wasting of great quantities of said supplies.

It is a further object of the invention to provide means automatically dispensing at regular intervals measured quantities of supplemental concentrated feed such as grain, making such dispensation dependent on the consumption of the main fodder.

Furthermore detailed objects of the invention will be explained in the following detailed specification.

The invention will be described with reference to the accompanying drawings showing one embodiment thereof. It is to be understood that this embodiment is shown by way of example and is illustrative of the principles on which the invention is based. It does not attempt to summarize the possible modifications of the invention. Modification of this embodiment based on the principles as explained may therefore form part of the invention and are not necessarily departures therefrom.

In the drawings:

Figure 3 is an elevational front view on an enlarged scale, of a section of the installation, including a gate post, the means for guiding the same and the grain bin operated by its movement.

Figure 4 is an elevational view of one of the posts of the gate, of a section of the guiding rail and of the means for guiding the post on the rail and for preventing tilting.

Figure 5 is an elevational view of the lower portion of the grain bin.

The main problem in connection with the feeding of cattle during the period in which they cannot feed on the land consists in the human labor involved in this occupation. The food such as hay or grain has to be apportioned in such a way that the animals have access to the day's supply, but not to a larger supply. If access to a larger supply is allowed enormous waste results. This fact renders it imperative to apportion and to distribute the food, to fill the hay into racks and perform similar jobs constantly. The constant attention to be paid to the feeding, therefore, is an obstacle to the distribution of the stock over the land or necessitates the distribution of the workers over wide stretches of land.

This invention intends to provide means for self-feeding of the stock during relatively extended periods in such a way that the waste is minimized or prevented.

With the system according to this invention the stock has access to all the food kept in store, while having access merely to some of the food at any time. The access to the remainder is only given at a rate corresponding to the consumption of food. The waste which is the result of accessibility of a quantity larger than the consumable quantity is thus avoided.

It has to be understood that the well-known appliances such as feed-racks located on the outside of a magazine or storage room containing hay are inadequate for dependable and regular feeding during protracted periods. The feed racks can be kept filled automatically merely under certain pressure conditions in the stack, which cannot be maintained where large quantities for long periods have to be stored in a comparatively limited space.

Another problem consists in providing a certain limited quantity of more concentrated fodder or feed material, such as grain or the like as a supplement, to the dry fodder. Self-feeders of the known type are not suitable for such supplements as they dispense an unlimited quantity.

Figure 2:
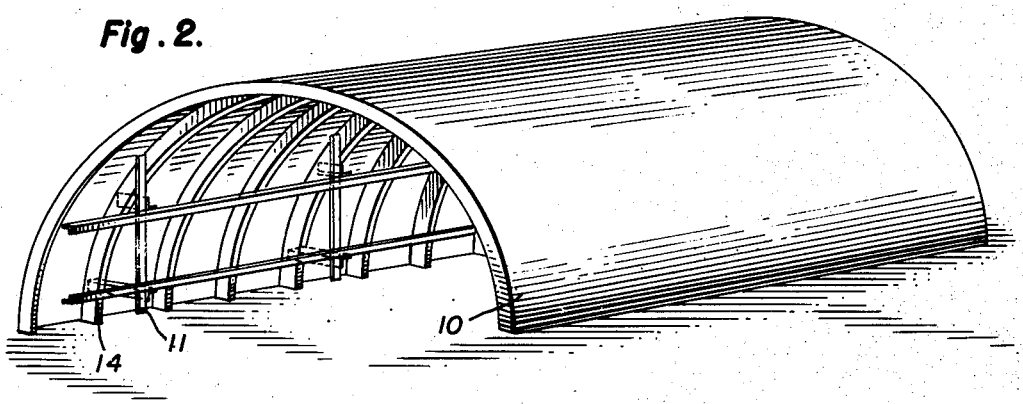
Figure 2 is a perspective view of the hut and of those parts of the installation which are fixed within the hut.
Figure 1:
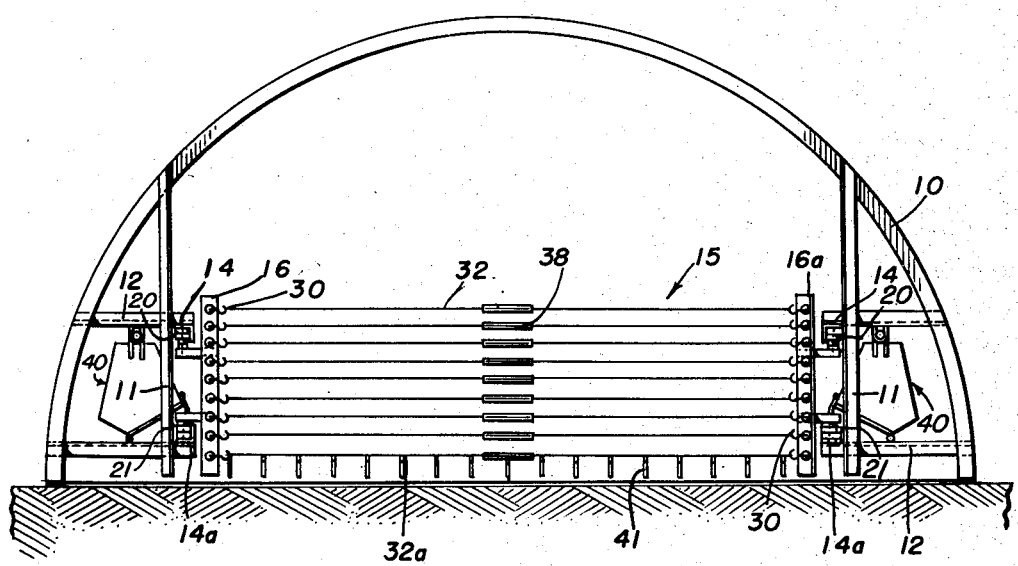
Figure 1 is a front view of the appliance shown as mounted in a hut.
Figure 6:
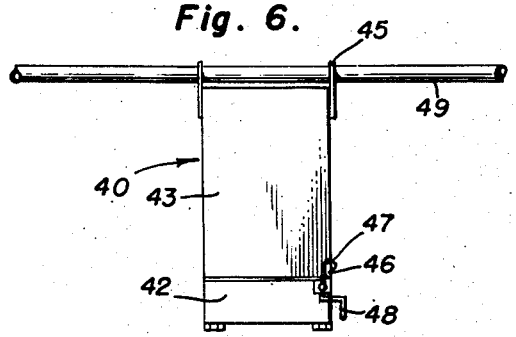
Figure 6 is a view showing the suspension of the grain bin on the guiding rails.

Accordingly to the invention the dry fodder, for instance hay, may be stored anywhere, in open air, in a building of any type, or in a so-called Quonset hut 10, such as shown in the drawing. It is rendered preferably inaccessible on all sides except at one or two places which are provided with the appliance illustrated. Posts 11 are arranged along the closed sides of the building which carry brackets or hangers 12 supporting two or more rails 14, 14a on each side. These rails may be angle irons with one of their flanges or sides arranged in a vertical plane. The rails are firmly secured on the hangers 12 by means of bolts or rivets and they form part of the fixed framework arranged along both sides of the building or hut 10 as shown in Figures 1 and 2.

Between the two frameworks carrying the rails a movable gate 15 is arranged. This gate consists of the two gate posts 16, 16a each of which is provided with two brackets 18, 19 carrying rollers 20, 21. The brackets are of such a length that they project outwardly beyond the vertical flanges of the rails 14 and the rollers 20, 21 are mounted on them on vertical bolts 22 forming the axles of the rollers, and are arranged near the end of the brackets, so that the rollers 20, 21 and the posts 16 are located on different sides of the vertical flanges of the rails 14, 14a.

The bolts 22 also serve to hold leaf springs 28 which are applied against the horizontal flanges of the rails 14, 14a and which preferably consists of two strip members inclined at an obtuse angle. The posts 16, 16a are thus held in an elastic manner and the longitudinal extension of the springs prevents the post 16 from adopting an inclined position with respect to the floor.

Each post 16, 16a is provided with a number of hook members 30, pivotally fixed on it, and adapted to hold cables 32 to be extended between the two posts 16, 16a. These cables are provided with loops 34 at their ends and at one end threaded bolts 36 are held by said loops, while on the other sides the loops are slipped into the hook members 30. The threaded bolts 36 of the cable sections, hooked in at corresponding hooks 30 of the cables 16, 16a are then pulled or drawn towards each other by means of turnbuckles 38 which permit to put a heavy tension on the cable, pressing the rollers 20, 21 towards the rails 14, 14a.

A number of cables is always inserted and tensioned between the posts 16, 16a and these posts and cables form the movable gate 15. The number of cables will however differ, according to local conditions. The cables serve the purpose of pulling the posts towards each other and of pressing the rollers towards the rail. In this way a kind of movable fence is formed which keeps the stock outside, and which prevents irregular feeding and demolition and destruction of the stack which, as a rule, results in an excessive waste of material. The stock can therefore only feed above the gate and through the spaces between cables of the gate, while the latter is always between them and the stack.

The number of cables stretched moreover varies in order to regulate the feeding of the stock through the gate. The extent to which such feeding through the gate is permitted is clearly governed by the distance between the stretched cables which makes it more or less difficult for the stock to get at the hay immediately behind the gate. In Figure 1 a gate has been shown with all the cables in place, a rigging which would correspond to a situation in which it is not desirable that the stock feeds through the gate.

The cable 32a which is stretched at the bottom may be provided with prongs 41 which are fixed on it and are curved towards the haystack and reach approximately to the bottom. Cables with prongs are used where it is intended to keep the floor as far as possible free from hay. When the gate is pushed towards the haystack the prongs act in the manner of a rake.

In order to supplement the dry hay fodder with grain or the like, grain bins 40 are suspended on a rail 49 attached to the hangers 12 or to some other part of the structure. The grain bins are preferably closed containers 43 provided with suspension hooks or loops 45 and a closure device 42 at the lower end. This closure device is pivoted at 44 to a portion of the bin which is approximately at the level of the lower rail 14a and may have an upwardly bent border portion encircling three of its sides. The open portion of the bin covered by the closure device is inclined and slopes down towards the point at which the pivot 44 of the closure device is arranged. It is provided with a hooked latch 46 engaging a ring 47 fixed on the container 43 which has a downwardly extending finger 48 projecting into the path of the brackets 19. When the gate 15 is pushed past the bin and the latter has become accessible the bracket 19 engages the finger 48 and pulls the hooked latch out of the ring 47. The closure device then drops and rests on the rail forming a kind of trough out of which the stock can feed.

As will be clear from the above description sufficient dry and grain fodder for the required period is stored within a building or hut or merely within an enclosure along which the posts 11 and rails 14, 14a are arranged. The gate 15 is then mounted at one side or on two sides so that it covers the front of the stack which is accessible. The grain bins are arranged along the rails 49 at suitable distance and the number of cables is so chosen that the stock may feed through the gate to the desired extent.

During feeding the stock pushes the gate towards the stacked hay but is always kept from gaining complete access to the stack as a fence-like structure is always in front of them. Therefore merely the outside of the stack is accessible and the stock is compelled to feed in a regular manner proceeding at the rate at which the hay is consumed. Nevertheless the hay is always in reach of the stock as the gate which forms the movable fence is merely stopped by the stack itself.

It will be noted that the gate cannot be pushed irregularly. A position inclined towards the rail, when viewed in a top view, is excluded on account of the fact that the cables do not allow such a position. A position in which the gate is inclined toward the rail in a side view or in which the top portion of the gate, for instance, is pushed farther than the bottom portion is prevented by the leaf springs which present a sufficient resilient resistance on a long lever arm to counteract any such tendency. The gate is therefore always kept forcibly in the correct position and gradual regular advance of the gate is secured.

During such gradual advance the gate will overrun the grain bins, one by one, as they are aligned along the rails. When the gate has overrun a grain bin completely so that it is practically outside it is opened and the desired quantity of supplemental foodstuffs will be delivered, the closure device serving as a kind of feeding trough.

Merely inspection by overseers at intervals but no permanent attention is therefore required and stock may be kept at outlying places during the winter months without requiring constant attention or labor.

It is clear that the above principles may be realized while using somewhat different mechanical means, and a change of construction does therefore not involve a departure from the subject matter set forth in the annexed claims.

I claim:

1. A food storing and feeding structure for the self-feeding of stock and other animals from supplies stored in a stack having protected and accessible sides, comprising parallel guiding rails extending along said protected sides of a stack and provided with a vertical guiding surface and a horizontal surface, a gate freely slidable along said rails, including vertical gate posts and rollers arranged in a horizontal plane, adapted to cooperate with said vertical guiding surfaces of the rail, means for holding said rollers, leaf springs held by the aforesaid means projecting transversely with respect to the gate and adapted to find their support on the horizontal surface of the guiding rails, and tensioned means stretching between said vertical gate posts, adapted to prevent passage through the gate, while kept in continuous contact with the stacked supplies during feeding.

2. A food storing and feeding structure for the self-feeding of stock and other animals from supplies stored in a stack having protected and accessible sides, comprising parallel rails fixedly held on the ground on opposite sides of the stack along protected sides of the same, each rail being provided with a vertical guiding surface, a gate freely slidable along said rails, said gate being held in a suspended position between said rails and adapted to be pushed against the stack by the animals when feeding, said gate consisting of vertical gate posts, of means for producing a pulling action, drawing the gate posts towards each other, said means forming a barrier preventing free access to the stack, and of rollers applied on the side of the guiding surfaces facing toward the outside and turned away from the gate, said rollers holding the gate posts against the pulling force of the aforesaid means and thus supporting the gate and also guiding the same during their movement along the rails, and means for adjusting the pulling force with which the gate posts are drawn together.

3. A food storing and feeding structure for the self-feeding of stock and other animals as claimed in claim 2 in which the means to draw the gate posts towards each other comprise cables, provided with loops, hooks attached to the gate posts, threaded bolts attached to the cables and turnbuckles cooperating with the threaded bolts and adapted to adjust the pulling force of the cable and the distance between the gate posts.

4. In a food storing and feeding structure for the self-feeding of stock and other animals as claimed in claim 2, foodstuff bins provided with automatic closure devices, means for aligning a number of such bins along the guiding rails, and engageable means on said bins and gate for operating the automatic closure device when the gate has passed the bin.

5. In a food storing and feeding structure for the self-feeding of stock and other animals as claimed in claim 2, foodstuff containers provided with an automatic closure device on its lower end, said closure device opening downwardly, and being pivoted to the container at a point approximately at a level with the lowest rail, a latch on said closure device and a ring on said container at one end of the container, a finger projecting from said latch, means on said gate for engaging said finger when the gate has passed along the foodstuff container, said closure device being arranged to drop onto the lowest rail when disengaged from the container.

WILLIAM A. MAJOR.

REFERENCES CITED

The following references are of record in the file of this patent:

UNITED STATES PATENTS

| Number | Name | Date |
|---|---|---|
| 35,259 | Ralston | May 13, 1862 |
| 537,702 | Morton | Apr. 16, 1865 |
| 313,319 | Goddard | Mar. 3, 1885 |
| 445,162 | Coffin et al. | Jan. 27, 1891 |
| 583,321 | Blue et al. | May 25, 1897 |
| 700,737 | Cantrell | May 27, 1902 |
| 1,189,151 | Madison | June 27, 1916 |
| 1,250,922 | Martindale | Dec. 18, 1917 |
| 2,200,727 | Swenson | May 5, 1940 |